United States Patent
Kirmse (10) Patent No.: US 6,262,993 B1
(45) Date of Patent: Jul. 17, 2001

(54) COMPUTER AND PERIPHERAL NETWORKING DEVICE PERMITTING THE PRACTICAL USE OF BUFFER INSERTION-BASED NETWORKS WHILE COMMUNICATING OVER UNSHIELDED TWISTED PAIR CONDUCTIVE MEDIA

(76) Inventor: Kevin Kirmse, 200 Rose Rd., A-202, King of Prussia, PA (US) 19406

( * ) Notice: Subject to any disclaimer, the term of this patent is extended or adjusted under 35 U.S.C. 154(b) by 0 days.

(21) Appl. No.: 08/963,036

(22) Filed: Nov. 3, 1997

Related U.S. Application Data (60) Provisional application No. 60/029,902, filed on Nov. 8, 1996.

(51) Int. Cl.[7] .............................. H04L 12/66; H04Q 9/00
(52) U.S. Cl. ...................................... 370/463; 340/825.05
(58) Field of Search ......................... 370/434, 450, 370/452, 463, 419, 420; 375/348, 257, 258; 340/825.05

(56) References Cited

U.S. PATENT DOCUMENTS

| | | | |
|---|---|---|---|
| 4,424,498 | 1/1984 | Murray et al. | 333/18 |
| 4,650,930 | 3/1987 | Hogeboom et al. | 379/93 |
| 4,803,485 | * 2/1989 | Rypinski | 340/825.05 |
| 4,926,418 | 5/1990 | Cidon et al. | 370/85.5 |
| 5,003,308 | 3/1991 | Furniss et al. | 341/100 |
| 5,119,402 | 6/1992 | Ginzburg et al. | 375/17 |
| 5,181,858 | * 1/1993 | Matz et al. | 439/188 |
| 5,408,500 | 4/1995 | Ginzburg et al. | 375/288 |
| 5,455,843 | 10/1995 | Cherubini et al. | 375/230 |
| 5,497,460 | * 3/1996 | Bailey et al. | 370/258 |

FOREIGN PATENT DOCUMENTS

| | | | |
|---|---|---|---|
| 0 544954 A1 | of 0000 | (EP) | G06F/3/06 |
| 2 250897 | of 0000 | (GB) | H04L/1/16 |
| 2 268373 | of 0000 | (GB) | H04L/1/16 |
| 2 268374 | of 0000 | (GB) | H04L/12/58 |
| WO 92/10894 | of 0000 | (WO) | H04L/1/16 |

OTHER PUBLICATIONS

ANSI–X3T10.1/1 145D, Jan. 4, 1996, *Information Technology*—Serial Storage Architecture—Physical Layer 1 (SSA–PH1).
ANSI–X3T10.1/1 146D, Oct. 2, 1996, *Information Technology*—Serial Storage Architecture—Physical Layer 2 (SSA–PH2).
Comlinear CLC006, Oct. 1996, National Semiconductor—Serial Digital Cable Driver with Adjustable Outputs.
Comlinear CLC014, Aug. 1996, National Semiconductor—Adaptive Cable Equalizer for High–Speed Data Recovery.

* cited by examiner

*Primary Examiner*—Chau Nguyen
*Assistant Examiner*—Chiho Andrew Lee
(74) *Attorney, Agent, or Firm*—Finneran & Finneran; Thomas R. Finneran (57) ABSTRACT

A Computer and/or Peripheral Networking Device, requiring Shielded Twisted Pair cabling and using a standard Buffer Insertion-based implementation, that allows Buffer Insertion-based devices to utilize the most commonly installed Unshielded Twisted Pair cabling, and to provide, when needed, a bypass mechanism that ensures that a node connected in a string of standard Buffer Insertion-based devices will not isolate, or otherwise disable other nodes if it goes off-line for any reason.

10 Claims, 8 Drawing Sheets

COMPUTER AND PERIPHERAL NETWORKING DEVICE PERMITTING THE PRACTICAL USE OF BUFFER INSERTION-BASED NETWORKS WHILE COMMUNICATING OVER UNSHIELDED TWISTED PAIR CONDUCTIVE MEDIA

CROSS REFERENCES TO RELATED APPLICATIONS

This invention is based upon the Provision Patent Applications, Ser. No. 60/029,902, Filed Nov. 8, 1996 filed on behalf of Kevin Kirmse.

BACKGROUND

1. Field of Invention
The Emerging Field of Computer Telecommunications Networking Telecommunications means communication over a distance (tele means "far off" in Greek), and refers mainly to electronic forms such as radio, television, telegraph, telephone, facsimile ("fax"), and computer communications. In modern distance-applications of telecommunications, typically the message is encoded on the energy form (electrical, electromagnetic, or optical) that links the source and destination. In the 1980s and '90s, telecommunications has come increasingly to refer to systems that simultaneously accommodate voice, sound, text, graphic, image, computational, and moving-image message forms. This invention supports improved telecommunications networking between computers and between peripheral devices that are connected to host computers.

Computer Communications

Since the 1960s, computer design has included the development of systems for the remote linkage of users to computers (time-sharing), and of computers to one another. Networks that have arisen for military, government, and large-company commercial users evolved beginning in the 1970s in Western Europe, Japan, and the United States. These networks have become increasingly interconnected and have included new additions from other regions of the world. In the 1990s, with large increases in the numbers of desktop computers on these networks, and further connections over the public telephone networks, it has become possible to exchange messages (electronic mail, or e-mail), computer bulletin-board postings, information files, and computer programs with thousands of other computers in the same network.

Among the best known noncommercial computer networks is the Internet which, in the early 1990s, connected some 13 million users worldwide. In many respects, the Internet offers a preview of computer-based public telecommunications of the future.

By the mid-1990s, up to 150 million personal computers had been connected to networks, as estimated by respected industry analysts. The vast majority of these networks involve the use of Unshielded Twisted Pair (UTP) or Shielded Twisted Pair (STP) wiring.

As implied in the earlier discussion of digital coding, it is technologically possible to combine nearly all telecommunications services on a common, very-high-capacity, switched, and interactive network. Video, voice, graphics, data, and computation services could all be easily and inexpensively available over this "information highway"—which would involve an interlinking and upgrading of already existing systems.

Just as the growth of industrial and urban society has depended upon such infrastructure components as transportation facilities and water and power supply, scholars of modern growth and development see telecommunications, and its computer capabilities, as a major infrastructure component of the information age. The economic development policy of the administration of President Bill Clinton included the development of the information highway as a basis for encouraging new businesses and improving the delivery of educational and social services. The future will see much more telecommunications planning in the form of infrastructure development.

Basic Components

The basic components of a telecommunications system are usually identified as the devices that link source and destination: (e.g., transmitter, signal, medium, and receiver); noise that may interfere with this process; and feedback that represents a reversal of message flow. Source and destination are defined as any entities—people or machines—capable of creating or responding to messages. A source selects a message, which is converted by a transmitter into an energy form, or signal, that can travel by a medium, usually broadcasting or wire, to a receiver that converts the message back to a form that can be understood by the destination. Several factors contribute to a loss or distortion of the signal. Collectively they may be referred to as noise; however, such effects as external interference (common-mode interference), inter-symbol interference, jitter, cross-talk (especially so-called near-end cross-talk), and attenuation all contribute to lowered usability of the signal once it has traversed a length of a given transmission medium.

Computer and Peripheral Networking

Within a network, the source and destination are each referred to as a node. In a computer network, the node is a host computer that interfaces with the human user(s) and with other host computers by means of said network. The computer is called a host because it serves as the center of a computing system. Peripheral devices such as disk drives, CD-ROMs, tape drives, printers and the like are networked together to form a system. A peripheral device may be connected to more than one host computer allowing the sharing of its resources.

Networking Media

Both the host computer node and the networked peripheral require a plurality of pairs of conductive connections to accomplish transmission at the Physical Layer. These can include Shielded Twisted Pair (STP), Coaxial Cable, and Unshielded Twisted Pair (UTP). Optical cables can also be used, with the required optical interfaces and connectors, in place of metallic or other electrically conductive media. Most modern office buildings have Unshielded Twisted Pair (UTP) wiring laid within walls and in ceilings. It has been estimated that over 90% of the in-place wiring is UTP. In earlier implementations of networks, STP constituted a greater share of the installed base of copper cabling. In the opinion of some cabling infrastructure suppliers, with the use of higher and higher communication speeds, and in situations where interference constraints or problems with compliance with FCC requirements are acute, there may well be a resurgence in the use of higher quality STP cabling.

Signal Protocols

A variety of protocols are used for host computer node and peripheral networking, including Carrier Sense Multiple Access with Collision Detection (CSMA/CD), often referred to as Ethernet, Token Ring, Distributed Queue Dual Bus (DQDB/SMDA), Asynchronous Transfer Mode (ATM), or Fiber Distributed Data Interface (FDDI), Small Computer (SCSI), Serial Storage Architecture (SSA), and Fiber Channel. Of these SSA is developing technology based upon a set of ANSI standards.

2. Description of Prior Art
Transmission Media

Various networking protocols, including Token Ring, Distributed Queue Dual Bus (DQDB/SMDA), Asynchronous Transfer Mode (ATM), or Fiber Distributed Data Interface (FDDI), Small Computer (SCSI), Serial Storage Architecture (SSA), and Fiber Channel expect, at least, Shielded Twisted Pair (STP) cabling.

Simple Shielded Twisted Pair (STP) cabling consists of a twisted pair or a multiplicity of twisted pairs, over which a single conductive shield is wrapped.

Higher-quality Shielded Twisted Pair (STP) consists of either multiple twisted pairs of wires in a single cable within which each pair is surrounded by a conductive shield, or a multiplicity of individually shielded twisted pairs, which themselves together are overwrapped with a conductive shield. These cables work well at high transmission speeds (up to 300 megabaud and beyond).

Unshielded Twisted Pair (UTP), sometimes called Telephone Twisted Pair, consists of one or more pairs of two wires held together by twisting them and insulated by, usually, a type of plastic. Different pairs within a cable will often be twisted using different numbers of twists per unit of cable length. While Unshielded Twisted Pair is the most prevalent installed wiring, it can have significant limitations The transmission characteristics of the wire itself are impacted by the presence and effect of non-ideal and non-linear properties such as impedance (a combination of resistance, inductance, and capacitance) in the cable and the associated connectors. The higher the frequency of the signal, the more that it will be attenuated, that is, the intensity of the desired high frequency signal components will be reduced. The higher frequency components of the signal, are more prone to contribute to unwanted interference in adjacent wire pairs in the cable (cross-talk). Electromagnetic coupling to the external environment also limits the transmission capacity and suitability of UTP. To get UTP to handle data at the high speeds needed for modern host computer and peripheral networking, a more complex approach is needed.

Adaptive equalization, as used in this invention, has been used to allow the use of unshielded twisted pair cabling within a slow-speed 16 Mbits/second Token Ring network. This is described in U.S. Pat. No. 5,455,843. The token Ring network protocol is significantly different from the buffer-insertion based protocol being enhanced by this invention. Also, the 200 and 400 Mbits speeds, discussed herein, are from 12.5 to 25 times faster, thus permitting the bandwidth required by today's and tomorrow's bandwidth intensive systems.

Another approach used to enable the use of unshielded twisted pair cabling is to demultiplex the signal into multiple data channels, as show by U.S. Pat. No. 5,119,402. The invention, discussed herein, does not use demultiplexing and does not use multiple channels, and the speeds attained by this invention exceed the maximum 125 megabits per seconds mentioned in the Ginzburg patent. Also, the Ginzberg patent mentions Fiber Distributed Data Interface technology used with Token Ring as opposed to the buffer insertion-based protocol. A second Ginzberg patent (U.S. Pat. No. 5,408,500) uses a duobinary coding system and does not use adaptive equalization.

The use of adaptive equalization with unshielded twisted pair wiring is not new (U.S. Pat. Nos. 4,424,498 and 4,650,930), the equalizer used in the present invention is improved along with the improved circuitry needed to handle buffer inserion-based protocol at much higher speeds than envisioned in the 1980's.

Computer and Peripheral Networking Protocol

Buffer Insertion is one approach to Computer and Peripheral Networking, wherein nodes within the network utilize a buffer to ensure that the network is deadlock free. A double ring approach is used with no tokens. The status of the insertion buffer governs node transmission. If nothing is currently being received into the insertion buffer and the insertion buffer is empty, then the node may transmit. This is described in part in Patent Cooperation Treaty Application WO 92/10894.

When a node receives anything from upstream it checks the address in the frame header to determine if it is the destination of the message. If the frame is addressed to this node then the data is directed to the node's receive buffer and does not go into the insertion buffer. This routing scheme is described in part in UK Patent Application GB 2 268 374 A. The serial data receiver approach used is described in U.S. Pat. No. 5,003,308. The standard Buffer Insertion approach uses an error recovery mechanism as described, in part, in UK Patent Application GB 2 268 373 A and GB 2 250 897 A.

A Disk Drive Synchronization used for disk drives utilizing the Buffer Insertion approach is described in European Patent Application 544 954 A1.

The standard Buffer Insertion approach fairness algorithm is described in U.S. Pat. No. 4,926,418.

The Buffer Insertion approach, as defined in the Serial Storage Architecture (SSA) ANSI standard, has an inherent switch level limitation. Therefore, a string or loop of nodes, that do not cross switches, is often an efficient architectural solution. Inherent to the string approach is the fact that an off-line non-operating node will break the string unless a bypass mechanism is utilized (the old-fashioned serial Christmas tree light problem).

The American National Standards Institute (ANSI) has published standards covering the Buffer Insertion approach to computer communications, and specifically the Serial Storage Architecture (SSA) method. These standards cover the specifications for the so-called Physical Layer, that is, the manner in which the physical connections between nodes are established and the nature of the electrical signaling that is used between them. For example, the published ANSI standard: *ANSI X3.293-1996: Information Technology—Serial Storage Architecture—Physical Layer 1 (SSA-PH1)* defines a single type of cable connection between physically separate nodes, using a cable connector available from a single manufacturing source, and employing two pairs of twisted wires for bi-directional communications, i.e. one pair in each direction, to and from each port on a node. The two pairs in the specified ANSI-standard Buffer-Insertion compliant simple STP cable are unshielded from each other, but are contained within a single outside conductive shield.

In addition, the SSA-PH1 standard defines the use of encoded data transmitted as a base-band digital signal using the non-return-to-zero (NRZ) method at 200 megabits per second.

The ANSI SSA-PH1 standard also refers to additional methods of connection that might be defined in a later standard, including optical links, and the use of higher communication speeds of 400 megabits per second using the base-band NRZ method. In fact, however, the later standard for the Physical Layer, SSA-PH2, now nearing completion of its public comment phase, defines the use of the same type of connector and simple STP cabling as SSA-PH1, and further, it stipulates that a device may be considered to comply with the SSA-PH2 standard even though it is capable of reliable communications over a distance of only 20 meters, while signaling at either 200 or 400 megabits per second.

In addition, SSA-PH2 explicitly excludes the detailed definition of devices called "Port Connection Couplers" (PCC's), that may be used to increase distances between nodes in a ANSI SSA-PH2 compliant network. Instead, PCC's are only required to comply with the SSA-PH2 signal quality and cable connections at the individual nodes. Between nodes, individual PCC's may include optical or other copper connections over longer distances than 20 meters, with suitable conversion to the ANSI compliant cable/connector combination at each node. The internal details of such PCC's including the manner of signaling between their elements, and the types of signal processing that is used are left to the manufacturer to define.

OBJECTS AND ADVANTAGES

Accordingly, several objects and advantages of our invention are the ability to connect standard Buffer Insertion implementation-based nodes, using commonly installed, cost-saving Unshielded Twisted Pair (UTP) cabling or higher-quality Shielded Twisted Pair (STP) cabling, in a string or switchless loop so that, if a node in the middle of the string is down, nodes connected beyond the down node will not be isolated and non-operating. In addition, with either UTP or STP cabling the effective distance between nodes can be up to 6 times that defined in the ANSI standard using Shielded Twisted Pair (STP) cabling while maintaining signal adequate clarity and intensity at the extended distances. The ability to use Unshielded Twisted Pair (UTP) or Shielded Twisted Pair cabling in conjunction with standard Buffer Insertion implementation-based node devices over much greater distances is advantageous within the node bypass configuration or standing by itself. The alternative embodiments would be advantageous in that the capability of the invention can be combined with other functionality on the same board or chip, providing the ability to use UTP or STP cabling in one board, an advantage for buffer insertion-based networking nodes, not requiring the bypass capability and for buffer insertion-based networking switches where there is a need to separate devices by more than 20 meters Still further objects and advantages will become apparent from a consideration of the ensuing description and accompanying drawings.
Insertion-based Networks.

Reference Numerals

10 Segment of Unshielded Twisted Pair (UTP) cable
12 Unshielded Twisted Pair (UTP) Connector
14 Media Conversion Device
16 Buffer Insertion-based Bypass Chip
18 Shielded Twisted Pair (STP) Connector
20 Buffer Insertion-based Networking Node
22 Power Supply
24 Battery Backup Unit
26 Segment of Buffer Insertion-compliant STP cable
28 Buffer Insertion compliant Serial Interconnect
30 Amplifying Cable Driving Circuit
36 Impedance Matching Terminating Resistance Circuit
38 Impedance Matching Resistance Circuit
40 Isolating and AC Coupling Capacitance Circuit
42 Standard RJ-45 Unshielded Twisted Pair Connector
44 Adaptive Equalizer Impedance Matching Resistance Circuit
46 Adaptive Equalizer
48 Two-Stage Adaptive Filter
50 Quantitized Feedback Comparator
52 Self-biasing DC Restore Circuit
54 High Speed Comparator
56 Adaptive Servo Control Block
58 Carrier Defect Block
60 Output Eye Monitor
62 MCV Power Supply Circuitry
64 5 Volt Power Supply Circuitry
66 3.3 Volt Power Supply Device
68 Battery Back-up
70 Printed Circuit Board
72 Normal/Bypass Mode Selector
74 Auxiliary Functions
76 Buffer Insertion Implementation-based Port
78 Bypass Routing Logic
80 Common Mode Torroid Choke or other reactive device
82 Auxiliary Amplifying Cable Driver Circuit
82 External Coupling/Impedance Matching
86 Buffer Insertion-based Networking Control Chip
88 MCV Driver/Equalizer Function

SUMMARY

The invention is a computer and/or peripheral networking device that uses or is compatible with the standard Buffer Insertion implementation approach, and that provides a mechanism for networking protocols to be exchanged utilizing Unshielded Twisted Pair or Shielded Twisted Pair cabling over distances of up to 150 meters or more. It further provides a bypass mechanism that ensures that a node connected in a string or switchless loop of standard Buffer Insertion-based devices will not isolate other nodes if it goes off-line for any reason. The Bypass Configuration contains a bypass device using the Buffer Insertion approach connected to each node in a computer or peripheral network. The bypass device is connected to matching media conversion devices so that if a buffer insertion based node within the string is out of service there is a pass-through ignoring the down node. Thus, either the more currently available and cost-saving UTP cabling or higher-quality STP cabling can be utilized while the effective distances between nodes can be significantly increased over that defined in the ANSI standard requiring STP cabling.

Figure 1:
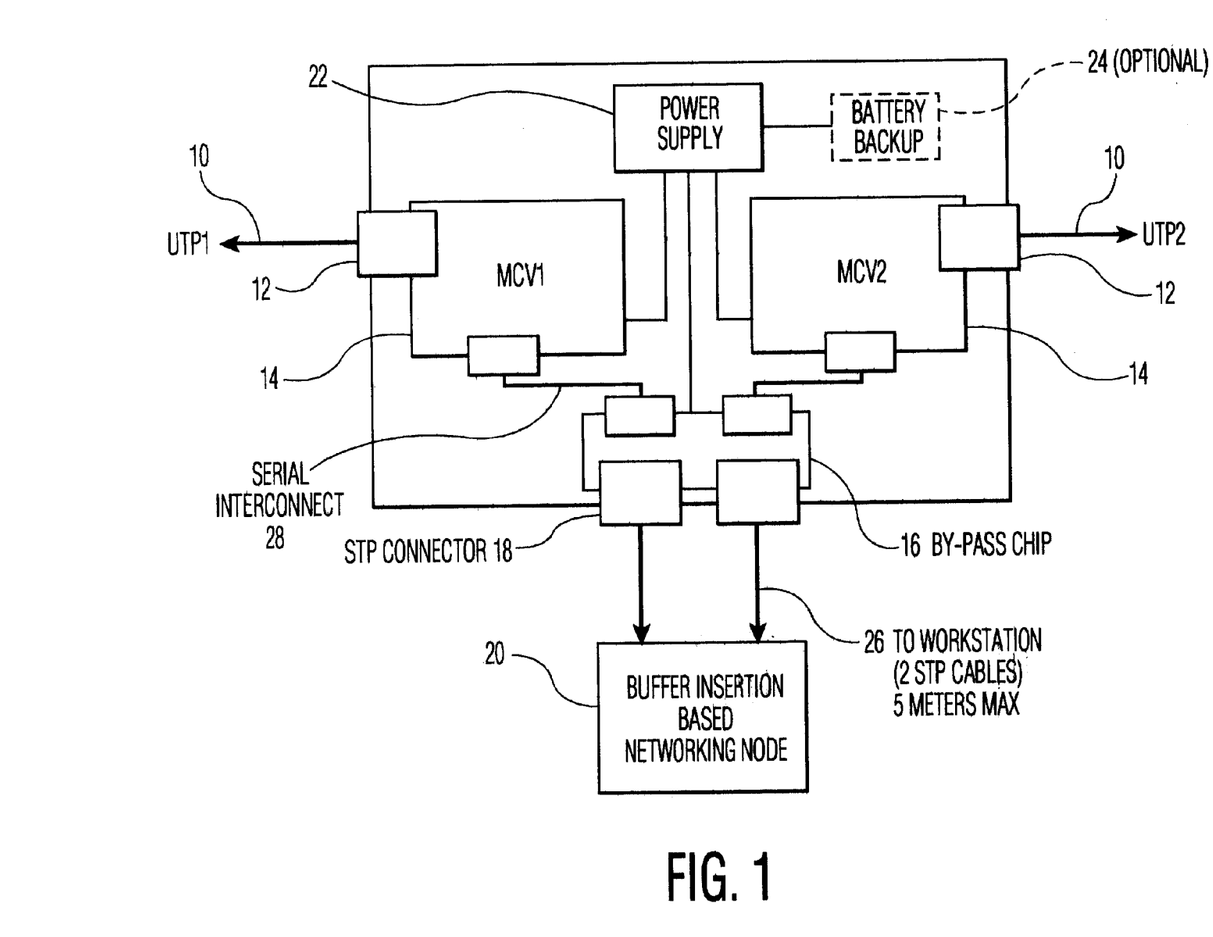

FIG. 1 shows UTP (or alternatively, higher quality STP) cable connected to the Media Conversion device which is, in turn, connected to the bypass device attached to a Buffer Insertion-type network node. The bypass device is also connected to a paired bypass device also attached to a Buffer Insertion-type network node. The paired bypass device is, in turn, connected to a paired Media Conversion device that is connected to UTP (or alternatively, higher quality STP) cabling.

The Media Conversion (MCV) device (whose function is similar to that defined for Port Connection Couplers (PCC's) in the ANSI standard) consists of three major components:

(1). The circuitry for conversion of ANSI-standard Buffer Insertion-compliant STP based signals to signals carried on UTP or higher quality STP.

(2). The circuitry for conversion of UTP or higher-quality STP based signals to signals carried on ANSI-standard Buffer Insertion-compliant STP.

(3). MCV Power Supply Circuitry whose power is either drawn from an independent source, or alternatively, from the device in which the MCV is installed.

The Media Conversion Device may be combined with the Bypass Configuration, or used as a stand-alone device. The combined Media Conversion and Bypass Device may be used as a standalone device. The Media Conversion Device may be included in circuitry on a Buffer Insertion implemented Network Interface Card (NIC), or in circuitry on a Buffer Insertion implemented Network Switch device, connected to other such switches, NIC's, or Media Conversion devices themselves combined with the Bypass Configuration.

PREFERRED EMBODIMENT—DESCRIPTION
FIG. 1—Block Diagrams of the Bypass Configuration FIG. 1 is a block diagram of the bypass configuration, connected to a standard Buffer Insertion-based node, and to UTP or suitable higher-quality STP cabling. Because of the aforementioned switch limitation with the standard implementation of Buffer Insertion-based network node devices, a plurality of Buffer Insertion network nodes will be connected in the form of a string or switchless loop. A Bypass device using the Buffer Insertion approach will be connected each node and to matching media conversion devices so that if a buffer insertion based node within the string is out of service, there is a pass-through ignoring the down node. Otherwise, nodes beyond the down node will be isolated and non-operational from the switches and/or severs seeking to send them data (the old-fashioned, serial Christmas tree light problem.)

As has been stated, the ANSI-standard compliant Buffer Insertion approach requires the use of simple Shielded Twisted Pair (STP) cabling for distances up to 20 meters. The invention contains a Media Conversion Device (MCV) that allows the use of Unshielded Twisted Pair (UTP) cabling that is already commonly installed in most modern networking sites or higher-quality Shielded Twisted Pair (STP) cabling over distances much greater than 20 meters, and up to 150 meters or more.

FIG. 1 shows a Segment of Unshielded Twisted Pair (UTP) cable 10 (or optionally, suitable higher-quality Shielded Twisted Pair cable), connected to the Unshielded Twisted Pair (UTP) Connector 12 (or optionally, a suitable higher-quality Shielded Twisted Pair cable connector), included in one of the Media Conversion Devices, 14. Said Media Conversion Device 14 is connected via a Buffer Insertion compliant Serial Interconnect 28, to the Buffer Insertion-based Bypass Chip, 16. Said Serial Interconnect 28 is most often implemented as a set of conductive traces on a printed circuit board. Said Buffer Insertion-based Bypass Chip 16 is connected to a port of a Buffer Insertion based Node 20, through an ANSI-standard Buffer Insertion-compliant Shielded Twisted Pair (STP) Connector 18, and an ANSI-standard Buffer Insertion compliant Segment of Shielded Twisted Pair Cable 26. Said Buffer Insertion-based Bypass Chip 16 is connected to a second Media Conversion Device 14. Said second Media Conversion Device 14 is connected to a Segment of Unshielded Twisted Pair (UTP) cable 10 (or optionally, suitable higher-quality Shielded Twisted Pair cable) via the Unshielded Twisted Pair (UTP) Connector 12 (or optionally, a suitable higher-quality Shielded Twisted Pair cable connector). The whole configuration will contain a Power Supply 22, containing, optionally, a Battery Backup Unit 24.

Figure 2:
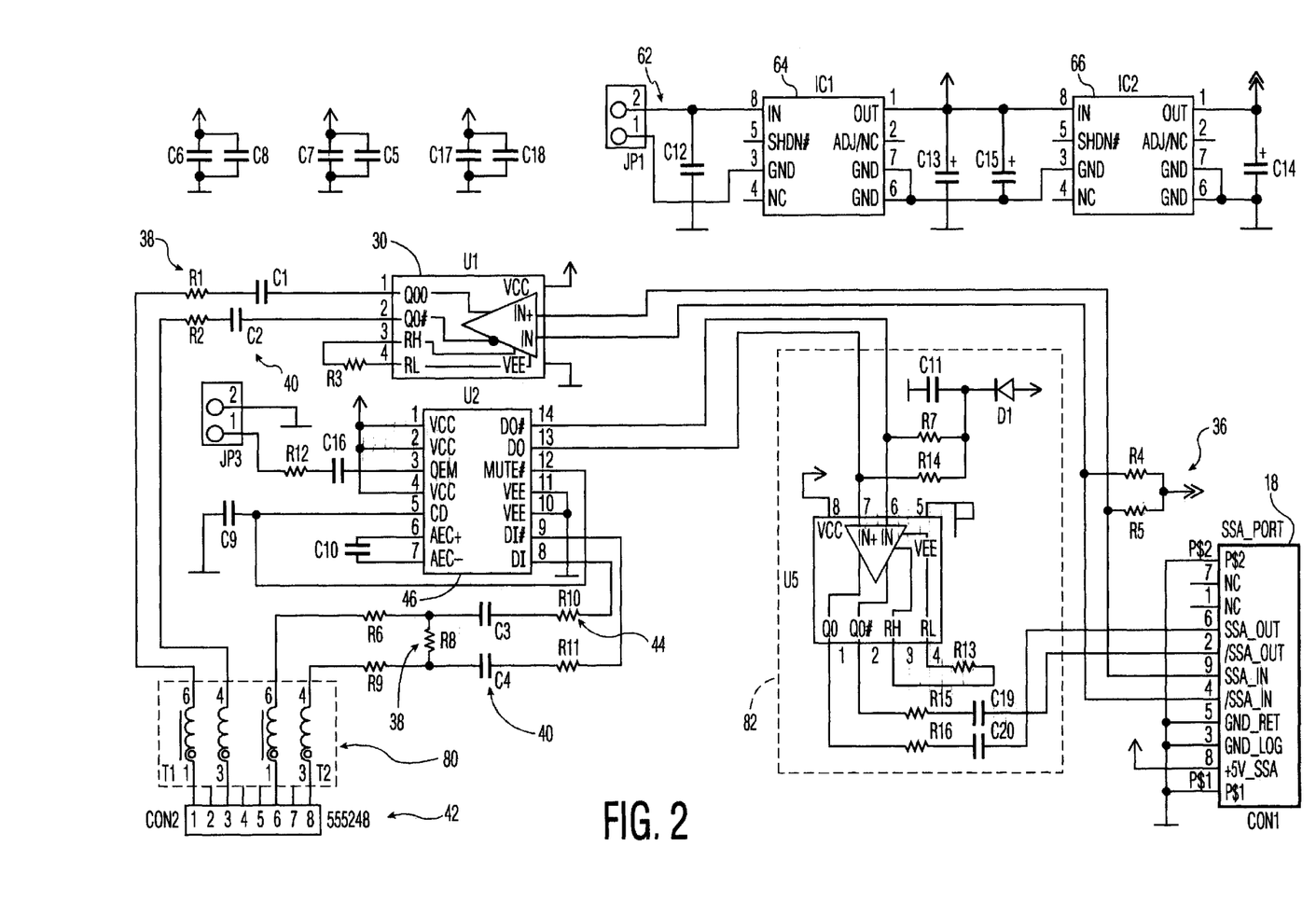

FIG. 2—Circuit Diagram of the Media Conversion device.

FIG. 2 is a Circuit Diagram of the Media Conversion device.

Said Media Conversion Device 14 consists of three major components:

The circuitry for conversion of a Buffer Insertion-compliant STP based signal for transmission over extended distances on UTP or higher-quality STP.

An ANSI-standard Buffer Insertion-compliant Shielded Twisted Pair (STP) Connector 18, designed to connect to 150 Ohm simple Buffer Insertion-compliant STP cable, and connected to a high speed networking interface device by means of a ANSI-standard Segment of Buffer Insertion-compliant STP cable 26.

An Impedance Matching Terminating Resistance Circuit 36 to properly terminate the incoming Buffer Insertion-compliant STP signal lines and eliminate mismatch of the STP impedance thus reducing signal reflections and interference due to said impedance mismatch.

An Amplifying Cable Driving Circuit 30 that tunes the differential voltage signal to a voltage within the range of adaptive equalization with a compatible adaptive equalizer on a receiving node. This serial digital cable driver is an emitter coupled logic compatible buffer, having two adjustable outputs. The circuit shown provides a conversion to a voltage drive, and a voltage boost to about 0.8 volts.

An Isolating and Coupling Capacitance Circuit 40 using a plurality of suitable high break-down voltage capacitors of approximately 500 to 3000 picofarads capacitance, and typically 1000 picofarads capacitance which circuit provides a satisfactory degree of DC voltage isolation for the safety of both the using person and the equipment.

An Impedance Matching Resistance Circuit 38, providing an impedance match to Unshielded Twisted Pair or optional higher-quality Shielded Twisted Pair characteristics, and an optional Common Mode Torroid Choke or other reactive device 80 on the outgoing UTP (or higher quality STP) signal lines.

A Standard RJ-45 Unshielded Twisted Pair Connector 42 (or optionally, a suitable higher-quality STP cable connector) to which the standard UTP wiring (or optionally, suitable higher-quality Shielded Twisted Pair cable) is connected.

The circuit for conversion of a signal transmitted on UTP or higher-quality STP to a signal suitable for transmission on ANSI-standard Buffer Insertion-compliant simple STP A standard RJ-45 Unshielded Twisted Pair Connector (or optionally, a suitable higher-quality STP cable connector) 42 designed to connect to 80–140 ohm (typically 100 ohm) UTP cable (or optionally, suitable higher-quality Shielded Twisted Pair cable of a similar impedance from 80 to 160 ohms), to which the standard cabling is connected, and an optional Common Mode Torroid Choke or other reactive device 80 on the incoming signal lines.

An Impedance Matching Resistance Circuit 38 providing an impedance match to Unshielded Twisted Pair or higher-quality Shielded Twisted Pair characteristics.

An Isolating and AC Coupling Capacitance Circuit 40 using a plurality of suitable high break-down voltage capacitors of approximately 500 to 3000 picofarads capacitance, and typically 1000 picofarads capacitance which circuit provides a satisfactory degree of DC voltage isolation for the safety of both the using person and the equipment.

An Adaptive Equalizer Impedance Matching Resistance Circuit 44 providing an impedance match to the adaptive equalizer characteristics.

An Adaptive Equalizer 46 that amplifies the received signal, and then selectively attenuates lower frequency components of the amplified signal so as to alleviate intersymbol interference and to adapt to signalchanges caused by non-ideal characteristics of the transmission medium, and enable reconstruction of the digital data signal.

An ANSI-standard Buffer Insertion-compliant Shielded Twisted Pair (STP) Connector 18, designed to connect to simple 150 Ohm STP cable compliant with the ANSI standard for Buffer-insertion networks, and connected to high speed networking interface device, by means of a segment of Buffer Insertion compliant simple STP cable.

Figure 5:
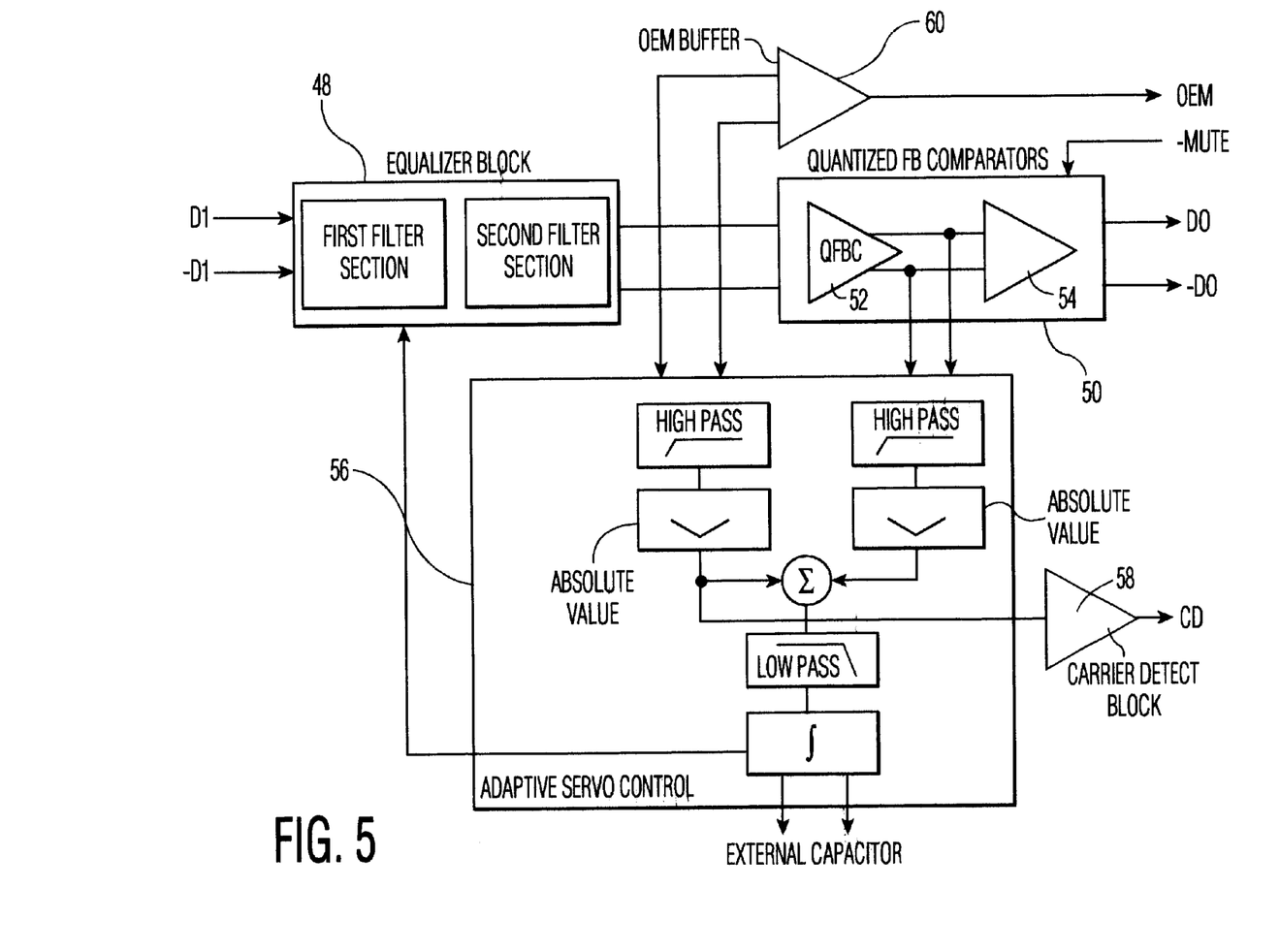

The adaptive equalizer typically used in this application contains the following components that are shown in FIG. 5.

A Two-Stage Adaptive Filter 48 able to equalize cable lengths from zero meters to lengths that require at least 40 dB of boost at 200 MHz.

A Quantitized Feedback Comparator 50 that receives differential signals from the adaptive filter, containing two comparators:
  The first comparator incorporates a Self-biasing DC Restore Circuit 52.
  The second comparator is a High Speed Comparator 54 with a output mute capability.

An Adaptive Servo Control Block 56 that produces the signal for controlling the filter block, and outputs a voltage proportional to cable length. It receives differential signals from the output of the filter block and from the quantized-feedback comparator to develop a control signal.

A Carrier Detect Block 58 that monitors the signal power out of the equalizing filter and compares it to an internal reference to determine if a valid signal is present. A CMOS high output indicates that the data is present.

An Output Eye Monitor 60 providing a single ended buffered output for observing the equalized eye pattern.

In some implementations, it may be advantageous to use an enhanced equalizer circuit that incorporates a method of "re-clocking" the signal after equalization, using a Phase Locked Loop (PLL). Such a re-clocking device may be a separate special purpose chip connected to the output of an adaptive equalizer chip, or alternatively, the PLL circuitry may be incorporated on to the same monolithic device as the adaptive equalizer.

MCV Power Supply Circuitry 62.
  A 5 Volt Power Supply Device 64
  A 3.3 Volt Power Supply Device 66

Figure 3:
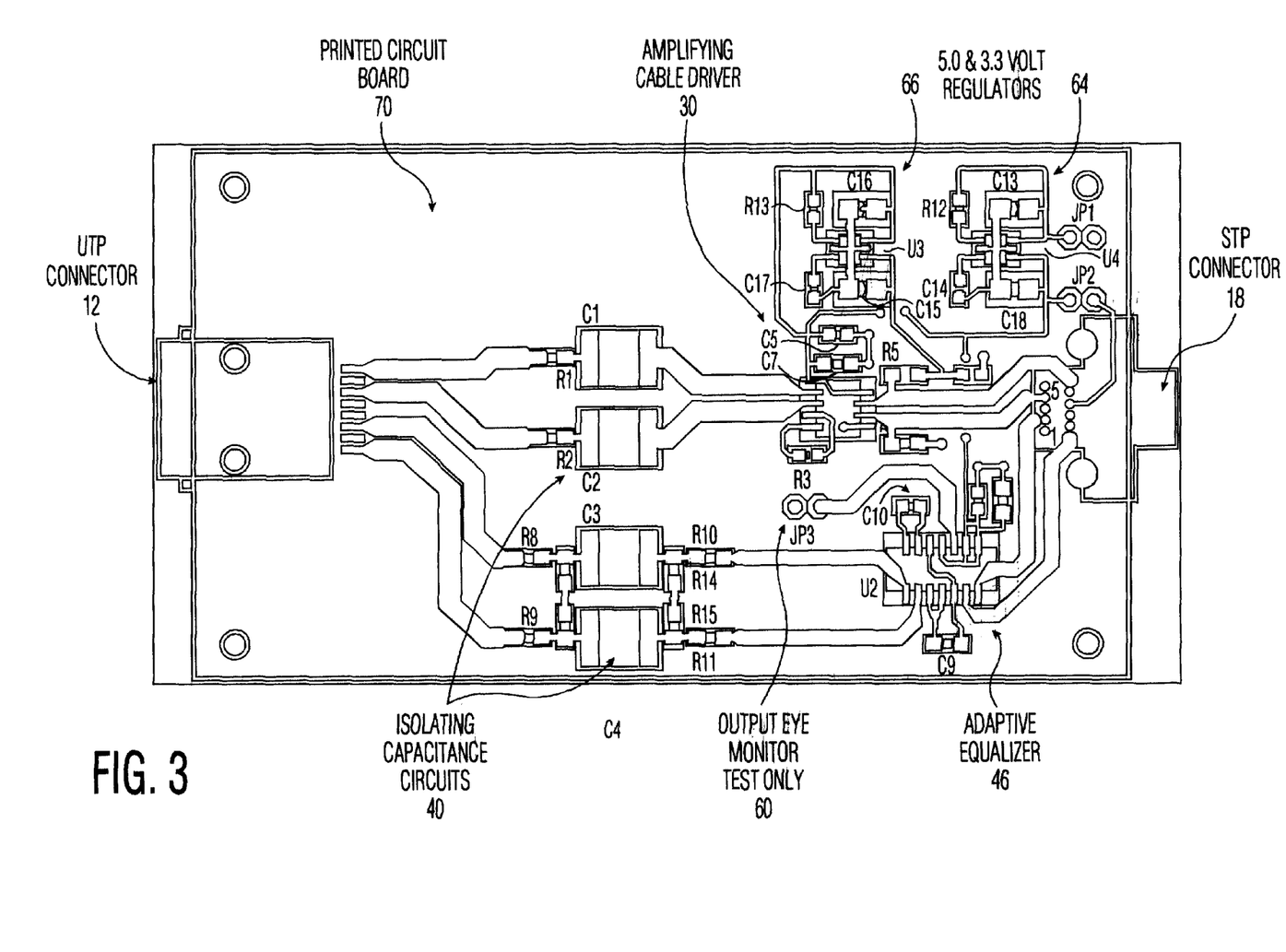

FIG. 3—The Layout of a Stand-alone MCV Device.

FIG. 3 shows the layout of a stand-alone MCV device. Where the MCV is used stand-alone to allow the use of extended lengths of UTP, or extended lengths of suitable higher-quality STP for devices normally requiring 20 meters or less of ANSI-standard Buffer-Insertion compliant simple STP, the device will be mounted upon a Printed Circuit Board 70. As shown, the Unshielded Twisted Pair Connector 12 (or optionally, a suitable higher-quality Shielded Twisted Pair cable connector) is connected to a plurality of Isolating and AC Coupling Capacitance Circuits 40, after impedance Matching. The Isolating and AC Coupling Capacitance Circuits 40 are connected to either the Amplifying Cable Driving Circuit 30 or the Adaptive Equalizer 46. The Adaptive Equalizer 46 (with, or without the optional Phase Locked Loop re-clocking circuitry) is connected directly (or optionally through an Auxiliary Amplifying Cable Driver Circuit 82) to the ANSI-standard Buffer-Insertion compliant simple STP Connector, whereas the Amplifying Cable Driving Circuit 30 goes through impedance matching resistance before connecting to the latter STP Connector. Both the 5 Volt Power Supply Device 64 and the 3.3 Volt Power Supply Device 66 are mounted upon said Printed Circuit Board 70.

Figure 4:
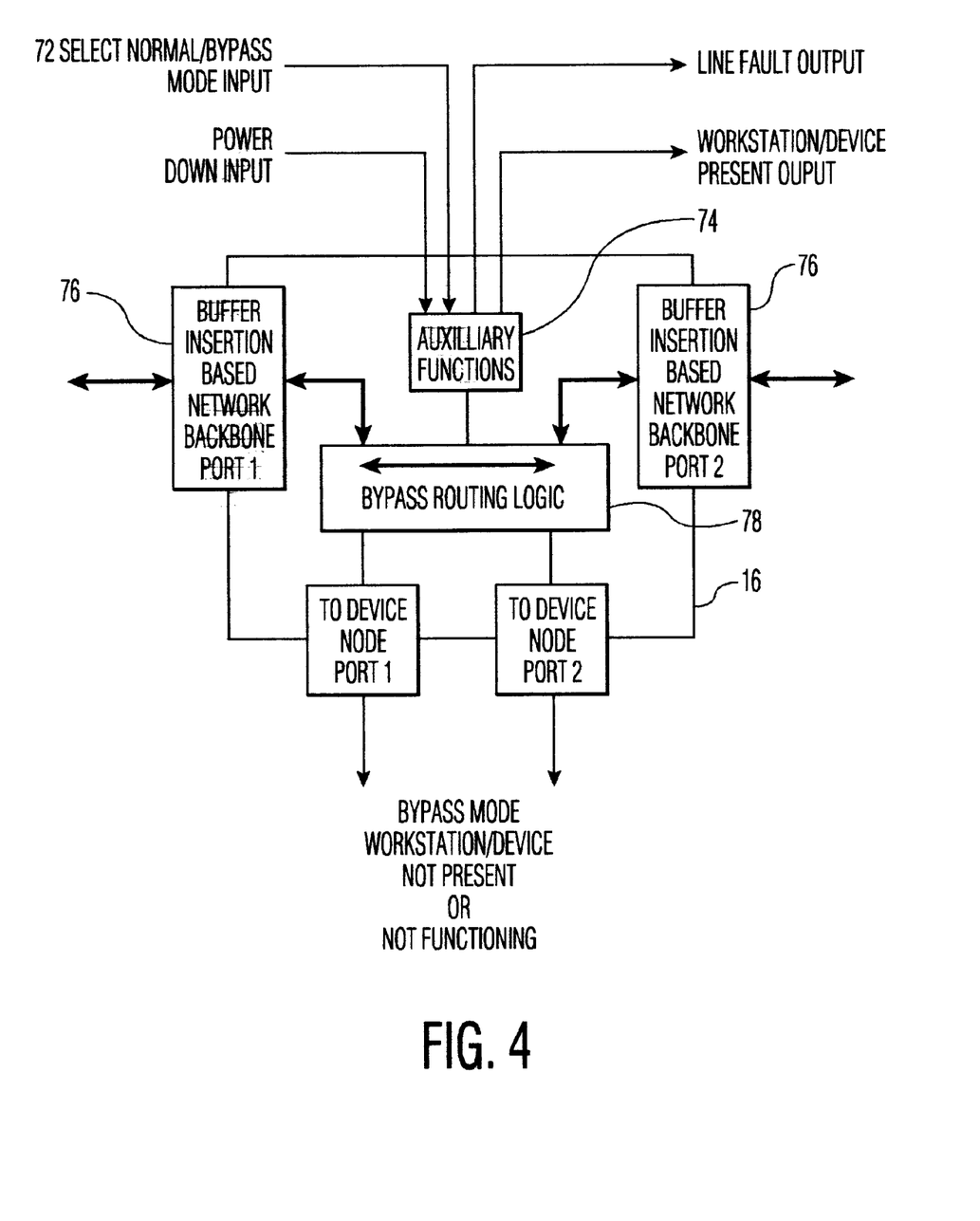

FIG. 4—The Bypass Chip Functional Block Diagram in Bypass Mode.

FIG. 4 shows the Bypass Chip Functional Block Diagram in Bypass Mode. When the Normal/bypass Mode Selector 72, included as a part of said Buffer Insertion-based Bypass Chip's 16 Auxiliary Functions 74, detects that Bypass is selected, The Network Signal enters into one of the plurality of Buffer Insertion Implementation-based Port 76 and is routed through said Buffer Insertion-based Bypass Chip's 16 Bypass Routing Logic 78 to another of the Buffer Insertion Implementation-based Port 76 and back out onto the network to another Buffer Insertion-based Networking Node 20.

Figure 4A:
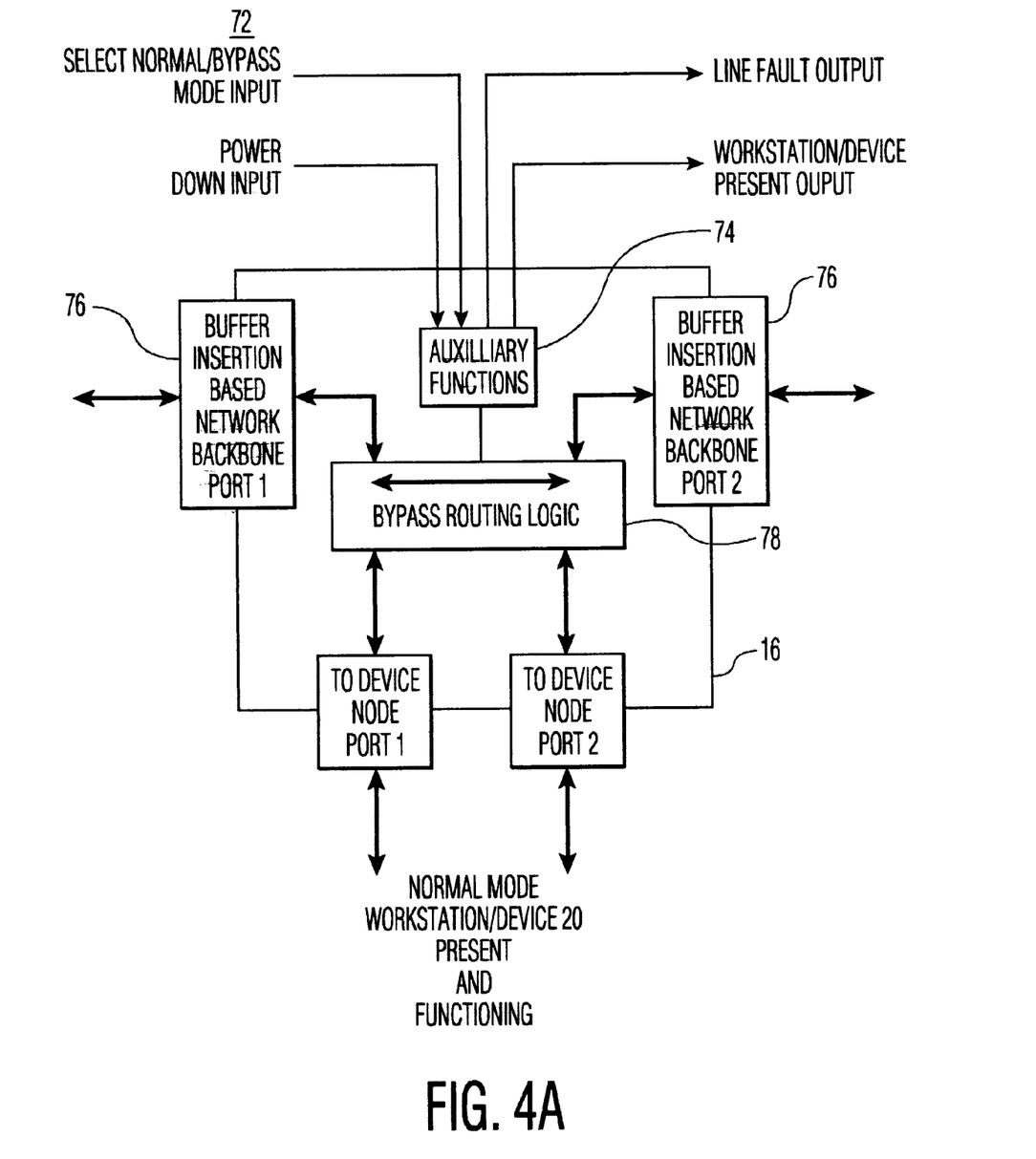

FIG. 4a—The Bypass Chip Functional Block Diagram in Normal Mode.

FIG. 4a shows the Bypass Chip Functional Block Diagram in Normal Mode. When the Normal/Bypass Mode Selector 72, included as a part of said Buffer Insertion-based Bypass Chip's 16 Auxiliary Functions 74, detects that Normal is selected, The Network Signal enters into one of the plurality of Buffer Insertion Implementation-based Port 76 and is routed through said Buffer Insertion-based Bypass Chip's 16 Bypass Routing Logic 78 to one of the plurality of Buffer Insertion-based Networking Nodes 20 to which said Buffer Insertion-based Bypass Chip 16 is connected.

PREFERRED EMBODIMENT—OPERATION

The preferred embodiments include 1) the use of the Media Conversion Device as a stand-alone device, and 2) The use of a pair of Media Conversion Devices together in combination with the Buffer Insertion-based Bypass Chip 16 in a single Buffer Insertion-based Bypass/Media Conversion Device Combined Module. In the latter case where the Buffer Insertion-based Bypass/Media Conversion Device Combined Module is used, a string or switchless loop of Buffer Insertion-based Networking Nodes 20 normally requiring 20 meters or less of ANSI-standard Buffer-Insertion compliant simple STP, will be cabled together using extended distance Segments of Unshielded Twisted Pair (UTP) cable 10 or extended Segments of suitable higher-quality STP.

Each Buffer Insertion-based Networking Node 20 has an ANSI-standard Buffer-Insertion compliant simple Shielded Twisted Pair (STP) Connector 18 connected to a Segment of Buffer Insertion compliant STP cable 26, which in turn will be connected to an ANSI-standard Buffer-Insertion compliant simple Shielded Twisted Pair (STP) Connector 18 included as part of the combined Bypass/Media Converter Device module. Internally, the ANSI-standard Buffer-Insertion compliant simple STP compliant connections are made to the Buffer Insertion-based Bypass Chip using the appropriate termination circuitry. Said Buffer Insertion-based Bypass Chip 16 will be connected by short Buffer Insertion-based Network Compliant Serial Interconnections 28 to each of the Media Converter Devices co-located and mounted with the said Buffer Insertion-based Bypass Chip 16. Said Buffer Insertion-based Network Serial Interconnections 28 may most conveniently be made using a set of conductive traces on the printed circuit board upon which the Buffer Insertion-based Bypass Chip 16 and the pair of Media Conversion Devices 14 are co-located and mounted. The Unshielded Twisted Pair (UTP) Connector 12 (or optionally, a suitable higher-quality Shielded Twisted Pair (STP) cable connector) included as part of said Media Conversion Device 14 will in turn be connected to other Buffer Insertion-based Networking Nodes 20 by means of long Segments of Unshielded Twisted Pair (UTP) cable 10 (or optionally, suitable higher-quality STP cable), which, said UTP or higher-quality STP cable will be in turn terminated by either a stand-alone Media Conversion Device, or a Buffer Insertion-based Bypass/Media Conversion Device Combined Module.

Where said Bypass Configuration is not needed, said Media Conversion Device 14 used alone, and equipped with suitable ANSI-standard Buffer-Insertion compliant simple Shielded Twisted Pair (STP) connectors 18 and UTP connectors 12 (or optionally suitable higher-quality STP connectors) will allow Buffer Insertion-based Networking Nodes 20 and Switches to utilize Segments of Unshielded Twisted Pair (UTP) 10 or higher-quality STP cable, which is likely to be present in today's buildings.

OTHER EMBODIMENTS

The MCV included as a part of a NIC.—Description

Figure 6:
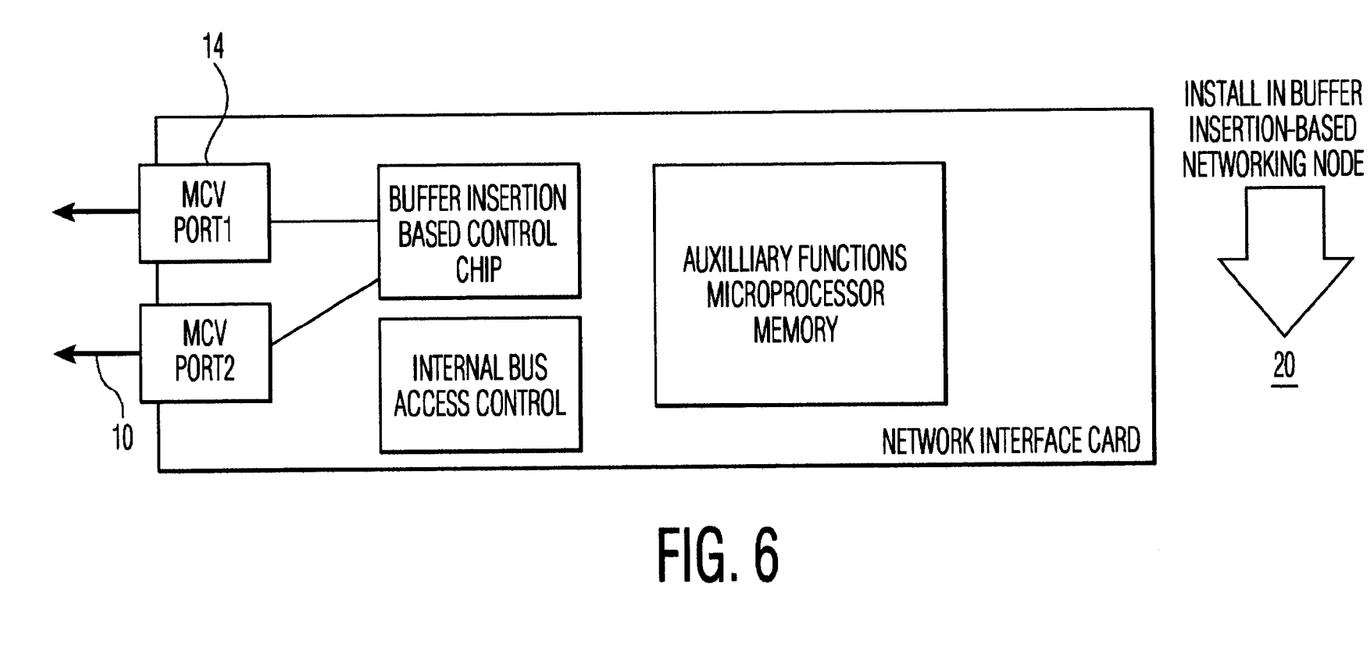
Figure 7:
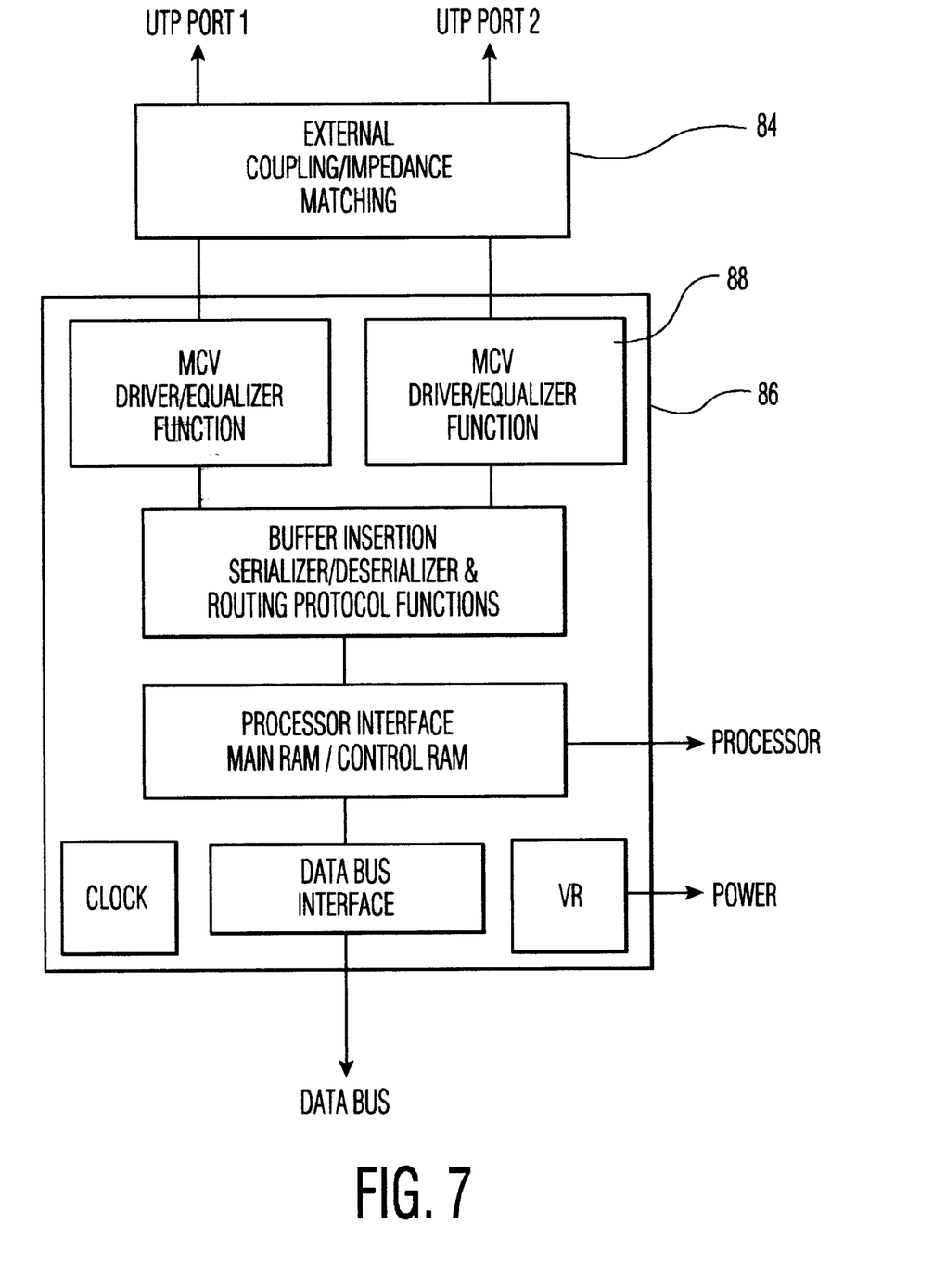

FIG. 6 shows the Media Conversion Device 14 as a part of the Network Interface Card included within every Buffer Insertion-based Networking Node 20 and by extension, multiple Buffer Insertion-based Networking Nodes that are together configured and operating as a Switch. This will provide the advantage of having the ability to directly connect such a node to suitable UTP or higher-quality STP cabling, thus eliminating the use of segments of ANSI-standard Buffer Insertion compliant simple STP cabling. This is advantageous for Buffer Insertion-based Networking Nodes 20 not requiring the Bypass capability, and for Buffer Insertion-based Networking Switches.

The MCV included as a part of a NIC.—Operation

The Buffer Insertion Network Interface Card (NIC) would actuate the Buffer Insertion-based Networking Node 20 and Switch. The inclusion of the Media Conversion Device 14 allows the use of Segments of Unshielded Twisted Pair (UTP) cable or higher-quality STP 10 for distances significantly greater than that specified in the ANSI standards for Buffer Insertion networks.

CONCLUSIONS, RAMIFICATIONS, AND SCOPE

Accordingly, it can be seen that a Buffer Insertion approach, embodied in the Serial Storage Architecture (SSA) protocol, wherein nodes and the network utilize a buffer to ensure that the network is deadlock free. Standard Buffer Insertion implementation-based nodes, using Unshielded Twisted Pair (UTP), or optionally higher-quality Shielded Twisted Pair cabling, in a string or switchless loop can be connected so that if a node in the middle of the string is down nodes connected beyond the down node will not be isolated and non-operating. The ability to use the above Unshielded Twisted Pair (UTP) or higher-quality Shielded Twisted Pair (STP) cabling in conjunction with standard Buffer Insertion implementation-based node devices is advantageous within the node bypass configuration or standing by itself. The ability to use the above mentioned UTP or STP cabling means that the effective distance between nodes can be up to 6 times that defined in the ANSI standard assuming the use of Buffer Insertion-compliant Shielded Twisted Pair (STP) cabling.

Although the description above contains many specifics, these should not be construed as limiting the scope of the invention but as merely providing illustrations of some of the presently preferred embodiments of this invention. Various other embodiments and ramifications are possible within the scope of the invention. For example, the alternative embodiments would be advantageous in that the capability of the invention can be combined with other functionality on the same board. There are many alternative transmission media that utilize similar capabilities, including optical fiber and coax cable. The invention will facilitate both computer networking and peripheral networking.

Thus the scope of the invention should be determined by the appended claims and their legal equivalents, rather than by the examples given.

What is claimed is:

1. A networking system device comprising:
  a means for converting a Buffer Insertion-compliant signal carried on ANSI-standard Buffer Insertion-compliant Shielded Twisted Pair cabling from a networking node to Unshielded Twisted Pair cabling comprising:
    a shielded twisted pair (STP) connector connected to buffer insertion-compliant STP cable;
    a means for eliminating mismatch of the STP impedance and for reducing signal reflections and interference due to impedance mismatch, connected to said shielded twisted pair (STP) connector;
    a means for tuning the differential voltage signal within a range of adaptive equalization of a comparable adaptive equalizer on a receiving node;
    an isolating and AC coupling capacitance circuit using a plurality suitable high break-down voltage capacitors;
    an Impedance Matching Resistance Circuit, providing an impedance match to Unshielded Twisted Pair characteristics;
    a common mode torroid choke or other reactive device 80 on the outgoing UTP signals lines;
    A Standard RJ-45 Unshielded Twisted Pair Connector to which the standard UTP wiring is connected;
  a means for converting a signal transmitted on Unshielded Twisted Pair cabling to a Buffer Insertion-compliant signal suitable for transmission on ANSI-standard Buffer Insertion-compliant simple Shielded Twisted Pair cabling to a networking node comprising:
    a standard RJ-45 Unshielded Twisted Pair Connector to connect to 80–140 ohm UTP cable;
    a common mode torroid choke or other reactive device on the incoming signal lines;
    a means for providing an impedance match to Unshielded Twisted Pair characteristics;
    an isolating and AC coupling capacitance circuit, using a plurality of suitable high break-down voltage capacitors;
    an adaptive equalizer impedance matching resistance circuit providing an impedance match to the adaptive equalizer characteristics;
    a means for amplifying the received signal, and then selectively attenuating lower frequency components of the amplified signal so as to alleviate intersymbol interference and to adapt to signal changes caused by non-ideal characteristics of the transmission medium, and enable reconstruction of the digital data signal;
    an ANSI-standard Buffer Insertion-compliant Shielded Twisted Pair (STP) Connector to connect to simple 150 Ohm STP cable compliant with the ANSI standard for Buffer-insertion networks, and connected to high speed networking interface device, by means of a segment of Buffer insertion compliant simple STP cable;
  a means for supplying necessary power.

2. A networking system device as defined in claim 1 wherein: said means for amplifying the received signal, and then selectively attenuating lower frequency components of the amplified signal so as to alleviate intersymbol interference and to adapt to signal changes caused by non-ideal characteristics of the transmission medium, and enable reconstruction of the digital data signal, comprises:
  a Two-Stage Adaptive Filter to equalize cable lengths from zero meters to lengths that require at least 40 dB of boost at 200 MHz;

a means for receiving differential signals from said adaptive filter, containing a plurality of comparators: where one of said comparators incorporates a self-biasing DC restore circuit, and another comparator is a High Speed Comparator with a output mute capability;

a means for producing the signal for controlling said filter block, for outputting a voltage proportional to cable length, and for receiving differential signals from the output of said filter block and from said quantitized-feedback comparator to develop a control signal;

a means for monitoring the signal power out of said equalizing filter and for comparing it to an internal reference to determine if a valid signal is present;

a means for providing a single ended buffered output for observing the equalized eye pattern;

a means for re-clocking the signal after equalization, using a Phase Locked Loop (PLL).

3. A networking system device, as defined in claim 1, further comprising:

a Buffer Insertion compliant Serial Interconnect connected to said means for converting a signal transmitted on Unshielded Twisted Pair cabling to a Buffer Insertion-compliant signal suitable for transmission on ANSI-standard Buffer Insertion-compliant simple Shielded Twisted Pair cabling;

a Buffer Insertion-based bypass chip connected to a port of a Buffer Insertion based Node, through an ANSI-standard Buffer Insertion compliant Shielded Twisted Pair (STP) Connector, and an ANSI-standard Buffer insertion compliant Segment of Shielded Twisted Pair Cable;

said Buffer Insertion-based Bypass Chip is connected to said means for converting a Buffer Insertion-compliant signal carried on ANSI-standard Buffer Insertion-compliant Shielded Twisted Pair cabling from a networking node to Unshielded Twisted Pair cabling;

a Power Supply, containing a Battery Backup Unit.

4. A networking system device, as defined in claim 1, further comprising:

a means for containing all components upon a network interface card;

a plurality of connected input/output ports connected to unshielded twisted pair cabling;

a buffer-insertion-based control chip a means for controlling internal bus access;

a microprocessor controlling network interface operations.

5. A networking system device, as defined in claim 1, further comprising:

a means for containing all components upon a single semi-conductor chip;

a plurality of connected input/output ports connected to unshielded twisted pair cabling;

a means for performing buffer-insertion-based serializing and de-serializing;

a means for performing buffer-insertion-based routing protocol functions;

a means for controlling internal bus access;

a microprocessor controlling network interface operations;

a clocking circuit;

a voltage regulation circuit a data bus interface.

6. A networking system device comprising:

a means for converting a Buffer Insertion-compliant signal carried on ANSI-standard Buffer Insertion-compliant Shielded Twisted Pair cabling from a networking node to Higher quality Shielded Twisted Pair cabling comprising:

a shielded twisted pair (STP) connector connected to buffer insertion-compliant STP cable;

a means for eliminating mismatch of the STP impedance and for reducing signal reflections and interference due to impedance mismatch, connected to said shielded twisted pair (STP) connector;

a means for tuning the differential voltage signal within a range of adaptive equalization of a comparable adaptive equalizer on a receiving node;

an isolating and AC coupling capacitance circuit using a plurality suitable high break-down voltage capacitors;

an Impedance Matching Resistance Circuit, providing an impedance match to Higher quality Shielded Twisted Pair characteristics;

a common mode torroid choke or other reactive device 80 on the outgoing UTP signals lines;

A suitable higher-quality Shielded Twisted Pair Connector to which the higher-quality STP wiring is connected;

a means for converting a signal transmitted on Higher quality Shielded Twisted Pair cabling to a Buffer Insertion-compliant signal suitable for transmission on ANSI-standard Buffer Insertion-compliant simple Shielded Twisted Pair cabling to a networking node comprising:

a suitable higher-quality Shielded Twisted Pair Connector to connect to 80–160 ohm higher-quality STP cable;

a common mode torroid choke or other reactive device on the incoming signal lines;

a means for providing an impedance match to Higher quality Shielded Twisted Pair characteristics;

an isolating and AC coupling capacitance circuit, using a plurality of suitable high break-down voltage capacitors;

an adaptive equalizer impedance matching resistance circuit providing an impedance match to the adaptive equalizer characteristics;

a means for amplifying the received signal, and then selectively attenuating lower frequency components of the amplified signal so as to alleviate intersymbol interference and to adapt to signal changes caused by non-ideal characteristics of the transmission medium, and enable reconstruction of the digital data signal;

an ANSI-standard Buffer Insertion-compliant Shielded Twisted Pair (STP) Connector to connect to simple 150 Ohm STP cable compliant with the ANSI standard for Buffer-insertion networks, and connected to high speed networking interface device, by means of a segment of Buffer Insertion compliant simple STP cable;

a means for supplying necessary power.

7. A networking system device, as defined in claim 6 wherein: said means for amplifying the received signal, and then selectively attenuating lower frequency components of the amplified signal so as to alleviate intersymbol interference and to adapt to signal changes caused by non-ideal characteristics of the transmission medium, and enable reconstruction of the digital data signal, comprises:

a Two-Stage Adaptive Filter to equalize cable lengths from zero meters to lengths that require at least 40 dB of boost at 200 MHz;

a means for receiving differential signals from said adaptive filter, containing a plurality of comparators: where one of said comparators incorporates a self-biasing DC restore circuit, and another comparator is a High Speed Comparator with a output mute capability;

a means for producing the signal for controlling said filter block, for outputting a voltage proportional to cable length, and for receiving differential signals from the output of said filter block and from said quantitized-feedback comparator to develop a control signal;

a means for monitoring the signal power out of said equalizing filter and for comparing it to an internal reference to determine if a valid signal is present;

a means for providing a single ended buffered output for observing the equalized eye pattern;

a means for re-clocking the signal after equalization, using a Phase Locked Loop (PLL).

8. A networking system device, as defined in claim 6, further comprising:

a Buffer Insertion compliant Serial Interconnect connected to said means for converting a signal transmitted on higher quality Shielded Twisted Pair cabling to a Buffer Insertion-compliant signal suitable for transmission on ANSI-standard Buffer Insertion-compliant simple Shielded Twisted Pair cabling;

a Buffer Insertion-based bypass chip connected to a port of a Buffer Insertion based Node, through an ANSI-standard Buffer Insertion compliant Shielded Twisted Pair (STP) Connector, and an ANSI-standard Buffer Insertion compliant Segment of Shielded Twisted Pair Cable;

said Buffer Insertion-based Bypass Chip is connected to said means for converting a Buffer Insertion-compliant signal carried on ANSI-standard Buffer Insertion-compliant Shielded Twisted Pair cabling from a networking node to Higher quality Shielded Twisted Pair cabling;

a Power Supply, containing a Battery Backup Unit.

9. A networking system device, as defined in claim 6, further comprising:

a means for containing all components upon a network interface card;

a plurality of connected input/output ports connected to higher quality Shielded Twisted Pair cabling;

a buffer-insertion-based control chip a means for controlling internal bus access;

a microprocessor controlling network interface operations.

10. A networking system device, as defined in claim 6, further comprising:

a means for containing all components upon a single semi-conductor chip;

a plurality of connected input/output ports connected to higher quality Shielded Twisted Pair cabling;

a means for performing buffer-insertion-based serializing and de-serializing;

a means for performing buffer-insertion-based routing protocol functions;

a means for controlling internal bus access;

a microprocessor controlling network interface operations;

a clocking circuit;

a voltage regulation circuit a data bus interface.

* * * * *